US009247157B2

(12) United States Patent
Choi et al.

(10) Patent No.: US 9,247,157 B2
(45) Date of Patent: Jan. 26, 2016

(54) AUDIO AND VIDEO DATA MULTIPLEXING FOR MULTIMEDIA STREAM SWITCH

(75) Inventors: Hoon Choi, Mountain View, CA (US); Daekyeung Kim, Palo Alto, CA (US); Ju Hwan Yi, Sunnyvale, CA (US); Wooseung Yang, Santa Clara, CA (US); Young Il Kim, Sunnyvale, CA (US)

(73) Assignee: LATTICE SEMICONDUCTOR CORPORATION, Portland, OR (US)

( * ) Notice: Subject to any disclaimer, the term of this patent is extended or adjusted under 35 U.S.C. 154(b) by 614 days.

(21) Appl. No.: 13/107,031

(22) Filed: May 13, 2011

(65) Prior Publication Data

US 2012/0287344 A1    Nov. 15, 2012

(51) Int. Cl.
*H04N 7/18* (2006.01)
*H04N 5/265* (2006.01)
*H04N 21/236* (2011.01)
*H04N 21/2368* (2011.01)

(52) U.S. Cl.
CPC ............ *H04N 5/265* (2013.01); *H04N 21/2368* (2013.01); *H04N 21/23608* (2013.01)

(58) Field of Classification Search
CPC ............ H04N 21/23614; H04N 5/775; H04N 21/23608; H04N 21/2365; H04N 21/242; H04N 21/4347; H04N 21/6405; H04N 21/8547; H04N 21/4344; H04N 21/2368; H04N 21/4341; H04N 21/4348; H04N 21/4394; H04N 5/265

USPC .................. 348/500–551; 370/535, 538, 542
See application file for complete search history.

(56) References Cited

U.S. PATENT DOCUMENTS

| 7,558,326 | B1* | 7/2009 | Lyle ...................... H04L 1/0057 348/469 |
| 2002/0163598 | A1* | 11/2002 | Pasqualino .................... 348/725 |
| 2004/0080671 | A1* | 4/2004 | Siemens et al. ............... 348/473 |
| 2005/0188297 | A1* | 8/2005 | Knight et al. .............. 715/500.1 |
| 2006/0012709 | A1* | 1/2006 | Yamada et al. ............... 348/515 |
| 2007/0204321 | A1* | 8/2007 | Shen et al. .................... 725/135 |
| 2008/0085124 | A1* | 4/2008 | Leung ................ H04N 21/2368 398/155 |
| 2011/0246172 | A1* | 10/2011 | Liberman et al. ................. 704/2 |

* cited by examiner

*Primary Examiner* — Sath V Perungavoor
*Assistant Examiner* — Nathnael Aynalem
(74) *Attorney, Agent, or Firm* — Fenwick & West LLP

(57) ABSTRACT

Embodiments of the invention describe a multimedia stream switch capable of multiplexing the audio and the video data of a multimedia stream separately. The multiplexing features of embodiments of the invention enable a multimedia stream switch to control each multimedia data type separately instead of multiplexing the whole streams (i.e., multiplexing sets of audio/video data together). Furthermore, prior art multimedia stream switches need to regenerate audio clocks by using phase locked loop (PLL) circuitry which incurs manufacturing and development costs. Embodiments of the invention provide the mixing of audio and video data from different sources without the need for PLL circuitry.

11 Claims, 7 Drawing Sheets

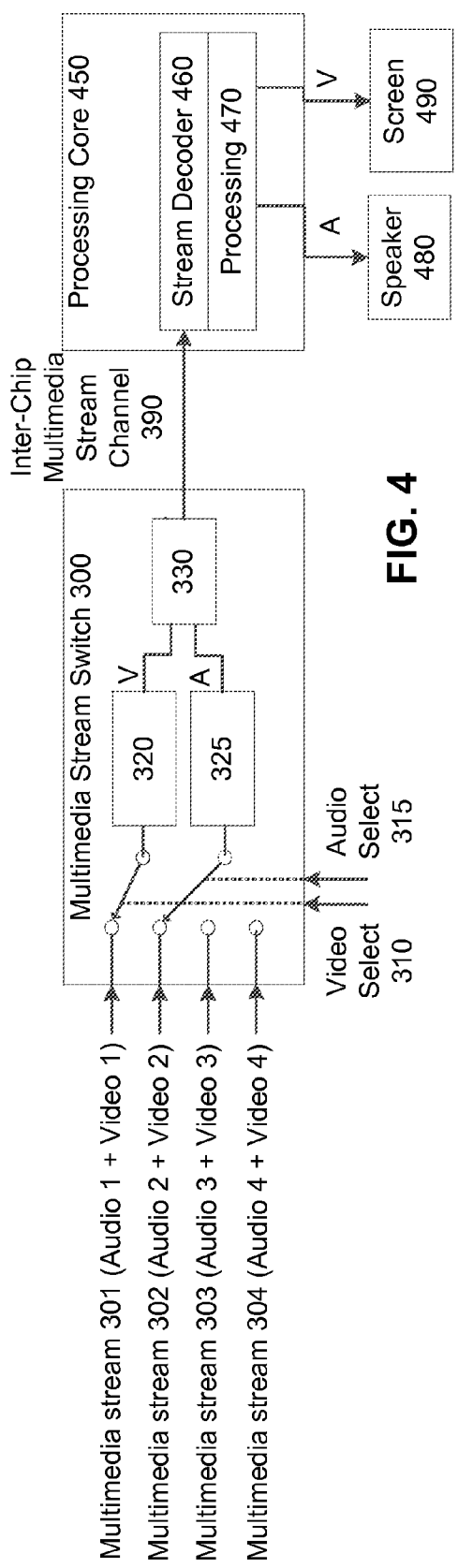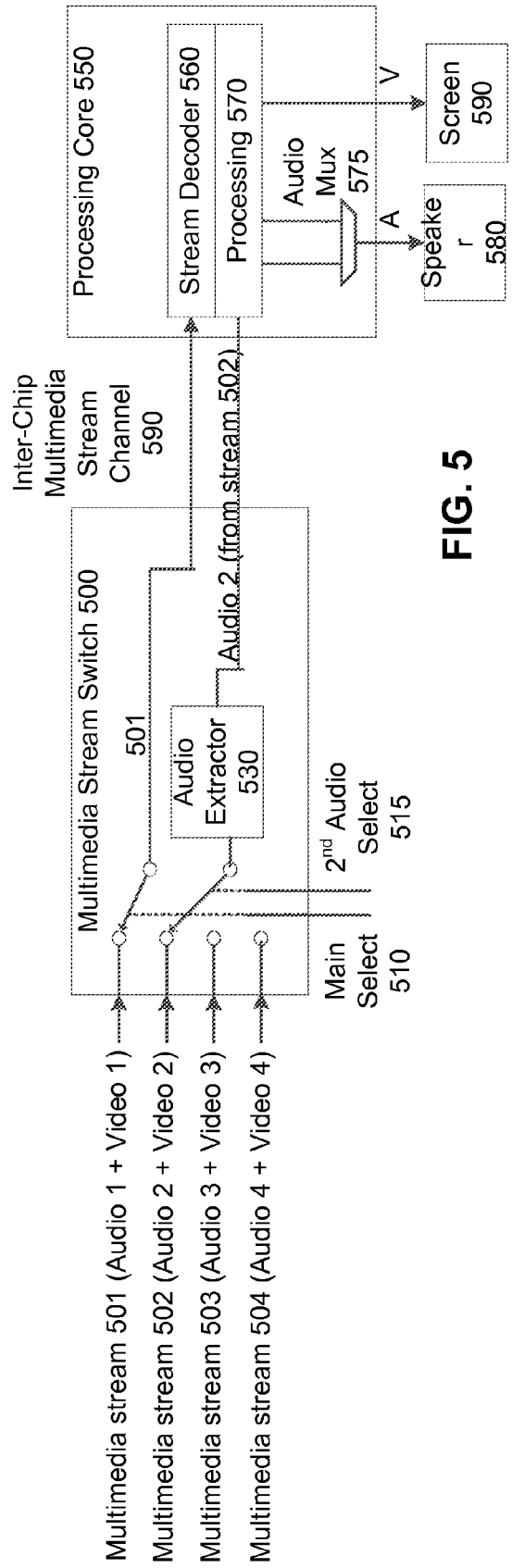
FIG. 4
FIG. 5

AUDIO AND VIDEO DATA MULTIPLEXING FOR MULTIMEDIA STREAM SWITCH

FIELD

Embodiments of the invention relate generally to the field of data communications and, more particularly, to transmitting and receiving multimedia stream data.

BACKGROUND

Systems transmit and receive multimedia content including audio and video data. For multimedia data that includes high-resolution video data and/or high-fidelity audio data, it is desirable to transmit the data in uncompressed digital form. Examples of such multimedia data include High-Definition Multimedia Interface (HDMI) data (e.g., data consistent with HDMI Specification Version 1.4a, published Mar. 4, 2010), Digital Visual Interface (DVI) data (e.g., data consistent with DVI Specification Revision 1.0, published Apr. 2, 1999), DisplayPort data (e.g., data consistent with the VESA DisplayPort Standard Version 1 Revision 1a, published Jan. 11, 2008), and Mobile High-definition Link (MHL) data (e.g., data consistent with MHL 1.0 Specification, published Jun. 30, 2010).

FIG. 1A is a block diagram of a prior art multimedia stream switch. Switch 100 receives a plurality of multimedia streams as input. In this figure, streams 101, 102, 103 and 104 are shown to be received by switch 100.

Switch 100 will output one of the input streams as multimedia output stream 190. The respective input stream is determined by stream select 110. Switch 100 is limited in that a user cannot select audio data from one stream to be output with video data from another stream (e.g., audio data from stream 1 cannot be output with video data from stream 2). Thus, even though a device is operatively connected to an input port of switch 100, a user cannot selectively only watch video or listen to audio sent from the device connected to the input port because switch 100 can control only one multimedia stream at a time.

FIG. 1B is a block diagram of the internal components of prior art multimedia stream switch 100, which includes three main components: multimedia stream decoders (in this figure decoder 121 is shown to receive multimedia stream 101, and decoder 122 is shown to receive multimedia stream 102; it is to be understood that each received multimedia stream has its own decoder), switch matrix 125 and multimedia stream encoder 126. Multimedia stream decoders 121 and 122 extract video data and audio stream internally. Switch matrix 125 then selects multimedia data from one of the ports and transfers them to encoder 126, which combines the video and audio data to generate outgoing multimedia stream 190.

Multimedia stream decoder 121 is shown to include video data extractor 131 (to extract video data 144), audio data extractor 133 and audio data information extractor 132 (it is understood that decoder 122, although not shown, includes similar components). It is understood that the audio and video data included in multimedia streams are transferred by sharing bandwidth. In most multimedia streams, a link clock (shown here as link clock 145) will be included with the audio/video data, where there exists a rational (integer divided by integer) relationship between link clock 145 and the video clock. Thus the regeneration of the video clock may be simply generated from the link clock by using a constant clock divider and multiplier.

However, audio clock regeneration (ACR) requires additional logic (i.e., divider 134 and multiplier 135) because there is no such relationship between link clock 145 and the audio clock. Since the relationship is unknown, information representing the relationship needs to be transferred periodically. This information can be represented by two terms: numerator N (shown as signal 142) and denominator cycle time stamp (CTS) values (shown as signal 140). The relationship between the link clock and audio clock is:

$$f_{audio} = f_{link} * N/CTS$$

where $f_{audio}$ is the frequency of the audio clock and $f_{link}$ is the frequency of the link clock 145. Value N 142 is extracted from multimedia data stream 101 via audio data information extractor 132 by referring to the frequency of the audio clock. During N audio clock cycles, which is the same duration of time as one cycle of stamping clock 141 ($f_{stamp} = f_{audio}/N$), audio data information extractor 132 counts the number of the link clock cycles, which becomes CTS value 140 at the corresponding stamping period. At every stamping clock cycle, both N value 142 and CTS value 140 are transferred to the ACR logic. The ACR logic then recreates audio clock 143 from link clock 145 by using clock divider (by CTS) 134 and clock multiplier (by N) 135. When link clock and audio clock are asynchronous, CTS value 140 may slightly vary at every cycle of stamping clock 141. Audio clock 143 and audio data 147 (extracted from audio data extractor 133) are thus combined via logic 136 to form audio data stream 146.

Switch matrix 125 selects which set of video data, audio data stream and link clock to forward to multimedia stream encoder 126 as video data 180, audio data stream input 182 and link clock 181. Multimedia stream encoder 126 includes audio stream receiver 171 to extract audio clock 187, audio data 185 and N value 184 (e.g., if stream 101 is selected, audio clock 187 will correspond to audio clock 143, and audio data 185 will correspond to audio data 147). Logic 172 may divide audio clock 187 by N value 184, and forward the result to Cycle Time Counter logic 173 to obtain CTS value 183. Data signals 180, 181 and 183-185 may then be processed via logic 174 to format the data into multimedia output stream 190.

Thus, multimedia stream switch 100 requires audio clocks to be regenerated. Phase Locked Loop (PLL) circuitries, such as multiplier 135, are used for each input multimedia stream port to generate an output clock whose phase is related to the phase of the input reference clock signal. PLLs are also used to synthesize the local clock with lower or higher frequency than the input reference clock. For audio clock regeneration, a PLL is used to generate an audio clock that is faster than the stamping clock by the factor N.

The cost of implementing PLL blocks is high. PLL blocks on most high-speed chips pose design and verification challenges. PLL blocks also require large on-chip area and consume large amount of power.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 4 is a block diagram of a computing system including an embodiment of the invention.

FIG. 5 is a block diagram of a computing system including an embodiment of the invention.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention describe a multimedia stream switch capable of multiplexing the audio and the video data of received multimedia data streams separately. The multiplexing features of embodiments of the invention enable a multimedia stream switch to control each multimedia data type separately instead of multiplexing only the whole data streams (i.e., multiplexing sets of audio/video data together).

Multimedia stream data may include high-resolution video data and/or high-fidelity audio data, and may be streamed in uncompressed digital form. Examples of such data include High-Definition Multimedia Interface (HDMI) data, Digital Visual Interface (DVI) data, DisplayPort data, and Mobile High-definition Link (MHL) data.

Furthermore, as described above, prior art multimedia stream switches need to regenerate audio clocks by using phase locked loop (PLL) circuitry which incurs manufacturing and development costs. As described below, embodiments of the invention provide the mixing of audio and video data from different sources without the need for PLL circuitry.

Figure 2A:
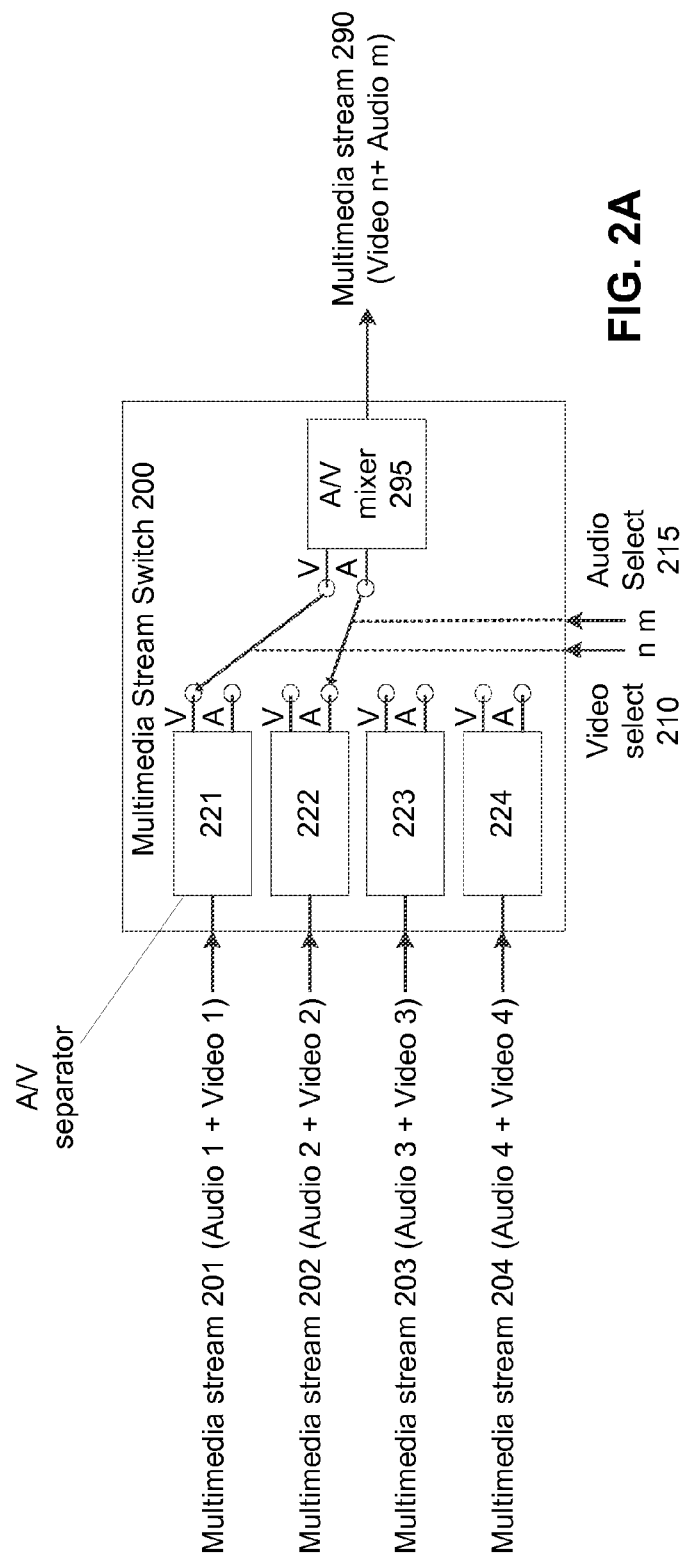
FIG. 2A and FIG. 2B are block diagrams of embodiments of the invention.
Figure 1B:
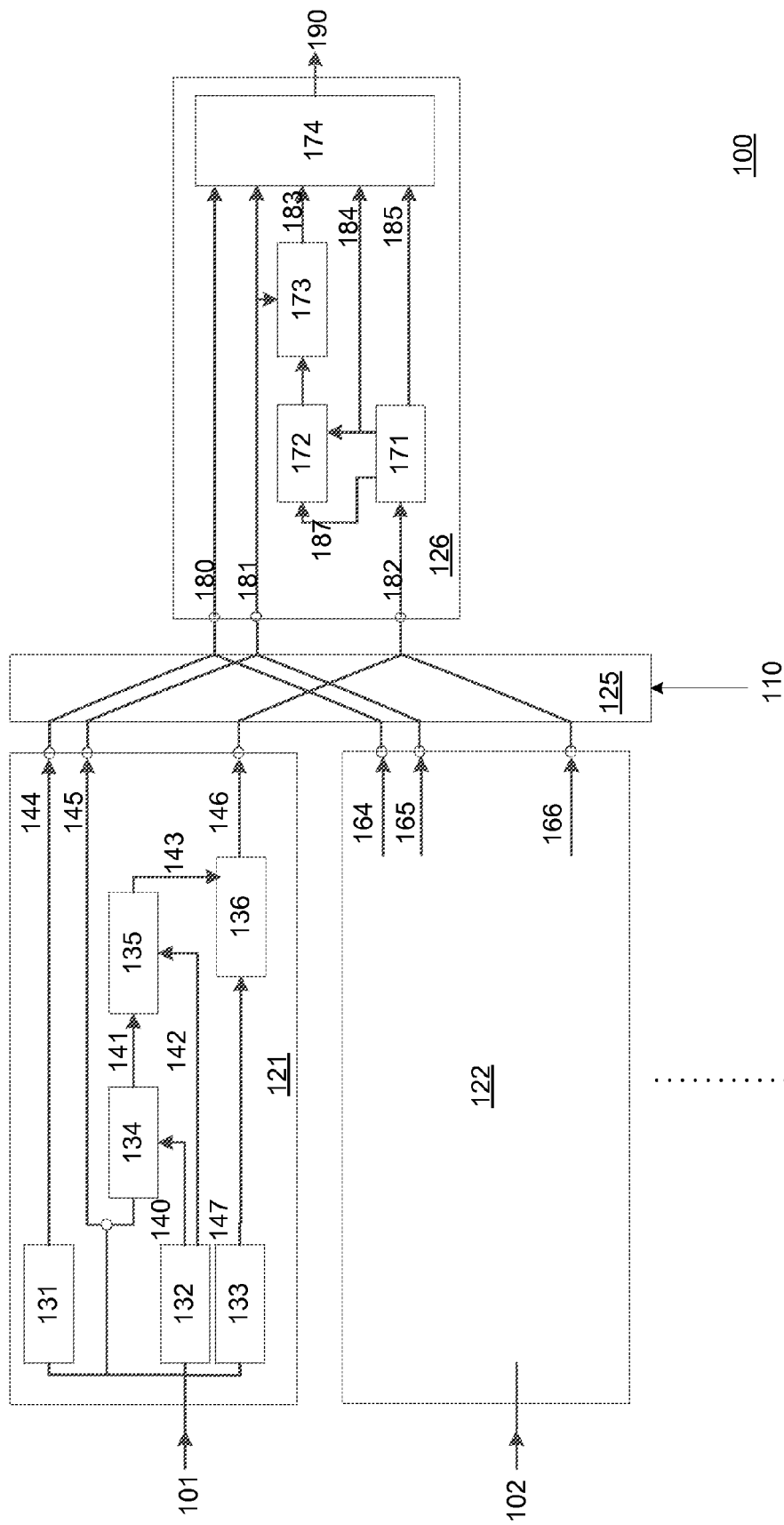

FIG. 2A is block diagram of a multimedia stream switch according to an embodiment of the invention. In this embodiment, multimedia stream switch 200 receives a plurality of multimedia streams as input. In this figure, streams 201-204 are shown as an example; it is to be understood that any number of streams may be received. Each stream may include audio and video data, and may originate from a plurality of devices (e.g., stream 201 may be received from a computing device, stream 202 may be received from a television set-top box, stream 203 may be received from a Blu-Ray DVD disc player, and stream 204 may be received from a video game console).

Figure 1A:
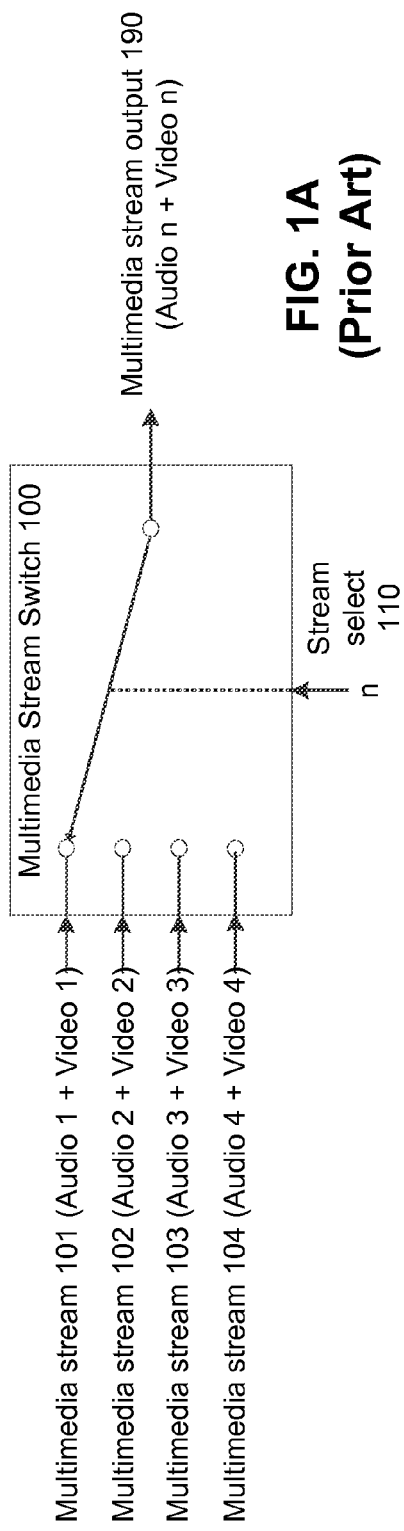
FIG. 1A and FIG. 1B are block diagrams of prior art.

Switch 200 will output multimedia output stream 290 based on video select data 210 and audio select data 215. Thus, in contrast to prior art multimedia stream switch 100 of FIG. 1A/1B, audio data from one stream may be output with video data from another stream (e.g., audio data from computing device stream 201 may be output with video data from video game console stream 204).

Multimedia stream switch 200 may be integrated, for example, in televisions (TV) and home theater receivers to support multiple multimedia input ports. As described in the example above, a personal computer and television set-top box may be connected to a TV via a first and second input port, respectively. Audio select data 215 and video select data 210 may indicate the desired output of switch 200 is to include the audio from the set-top box with the video display of the personal computer. With prior art multimedia stream switches, if the viewer selects the first input port, the viewer neither watches video nor listens audio from set-top box due to the restriction that both audio and video data must come from the same source (i.e., in this example the personal computer).

The multiplexing feature enabled by multimedia stream switch 200 enables a user to select video and audio from separate ports and combine them as one (or more) streams on the fly. Thus embodiments of the invention allow users to control video and audio separately from different ports. There are two separate 'select' signals: one for video, 210, and the other for audio, 215. The value of the 'video select' and 'audio select' signals may be either same or different. Audio/video separators 221, 222, 223 and 224 separate audio stream data and video stream data from input streams 201-204, respectively. Audio/video mixer 295 then mixes the selected audio and video streams, and outputs multimedia data stream 290.

Figure 2B:
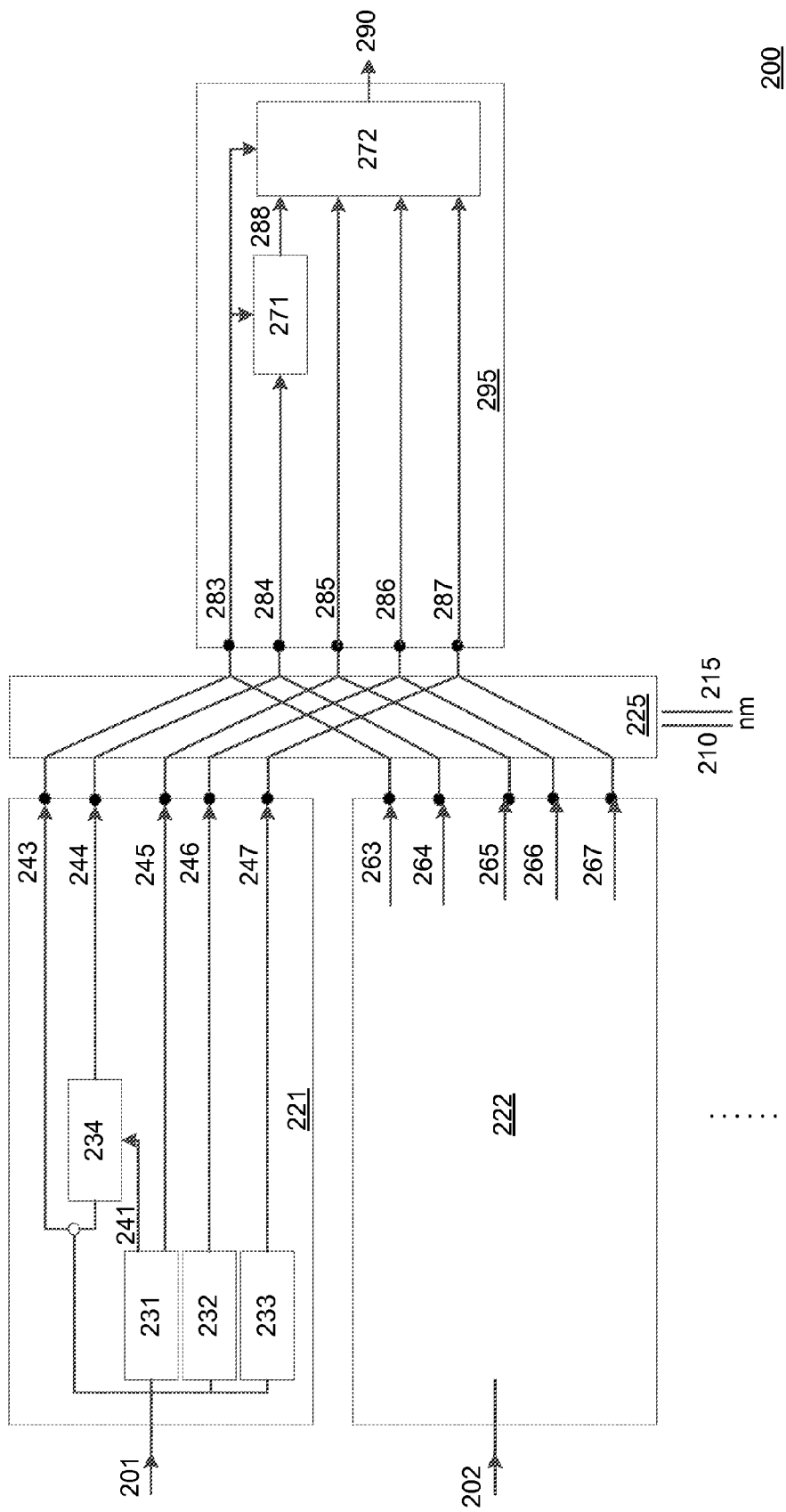

FIG. 2B is a block diagram of multimedia stream switch components according to an embodiment of the invention. In this embodiment, multimedia stream switch 200 includes multimedia stream decoder 221 to decode multimedia stream 201, stream select switch 225 and multimedia stream encoder 295.

Multimedia stream decoder 221 includes audio information extractor 231, video data extractor 232 and audio data extractor 233. Video data extractor 232 and audio data extractor 233 extract video data 246 and audio data 247, respectively, from multimedia stream 201.

In this embodiment, multimedia switch 200 further outputs link clock 243 received from multimedia stream 201. Audio information extractor 231 extracts CTS value 241 and audio clock cycle value N 245. Logic 234 divides link clock 243 by CTS value 241 to obtain time stamp clock 244. Thus, time stamp clock 244 is directly transferred to media stream select switch 225, rather than a regenerated audio clock as is done in the prior art.

It is to be understood that, in this embodiment, each multimedia stream received by multimedia stream switch 200 will have a corresponding decoder—e.g., decoder 222 is shown to decode multimedia stream 202 to obtain link clock 263, time stamp clock 264, audio clock cycle value N 265, video data 266 and audio data 267 (although not shown, decoder 222 has components/logic similar to that of decoder 221).

Stream select switch 225 will output the appropriate data—i.e., link clock 283, time stamp clock 284, audio clock cycle value N 285, video data 286 and audio data 287, based on input signals 210 and 215. In this embodiment, input signal 210 selects the video data while input signal 215 selects the audio data and relevant audio information (i.e., time stamp clock, audio clock cycle value N). For example, if input signals 210 and 215 indicate that video data from multimedia stream 202 is to be output with audio data from multimedia data stream 201, output link clock 283 will correspond to link clock 263, time stamp clock 284 will correspond to time stamp clock 244, audio clock cycle value N 285 will correspond to audio clock cycle value N 245, video data 286 will correspond to video data 266, and audio data 287 will correspond to audio data 247.

Multimedia stream encoder 295 will receive output signals 283-287 from multimedia stream select switch 225. Cycle time counter logic 271 will determine CTS value 288 from time stamp clock 284, and packet logic 272 will generate multimedia stream output 290 based on signals 283 and 285-

288 (thus, continuing the above described example, multimedia data stream output 290 will include video data from multimedia stream 202 and audio data from multimedia stream 201).

Therefore, multimedia output stream 290 may comprise audio and video data from separate multimedia streams received by multimedia stream switch 200. Furthermore, because a time stamp clock is directly transferred to multimedia stream encoder 295 rather than a regenerated audio clock, embodiments of the invention may combine video streams and audio streams from different sources without PLL circuitry, thereby reducing power consumption, on-chip area and design complexity.

Figure 3:
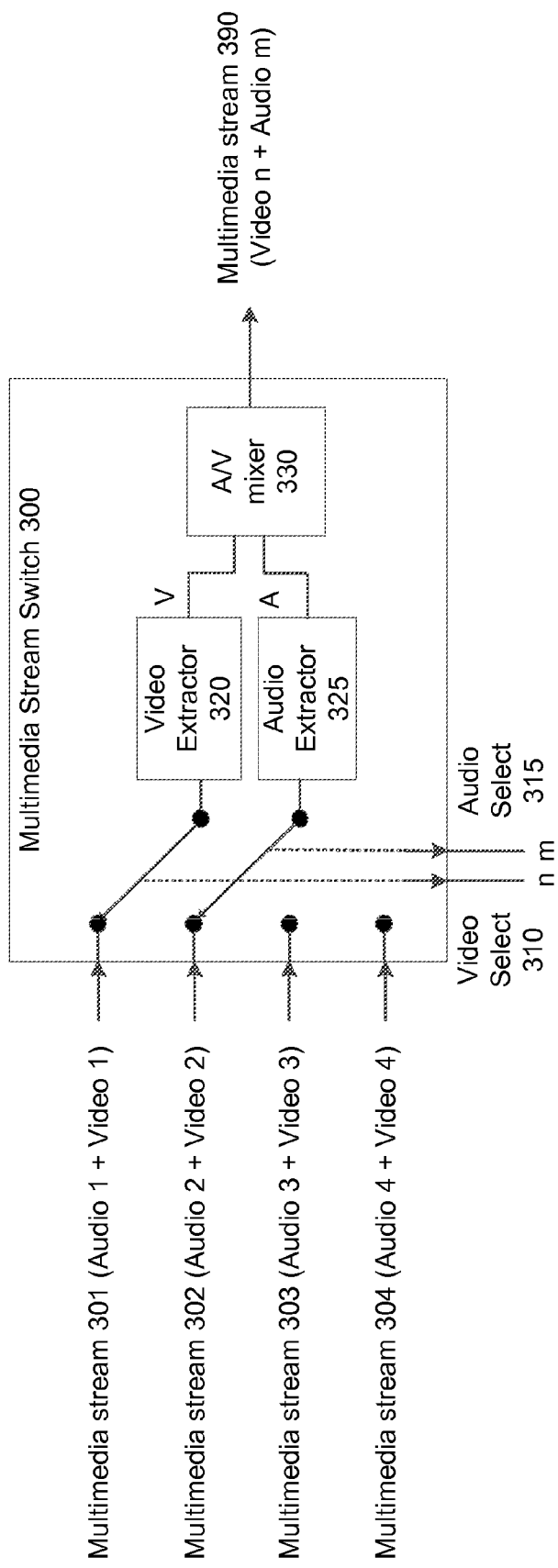
FIG. 3 is a block diagram of an embodiment of the invention.

FIG. 3 is a block diagram of an embodiment of the invention. In this embodiment, multimedia streams 301, 302, 303 and 304 are multiplexed at the front end of multimedia stream switch 300, based on video select input 310 and audio select input 315. Video extractor 320 extracts video streams from the multimedia data stream selected by video select signal 310 while audio extractor 325 extracts audio streams from the multimedia data stream selected by audio select signal 315. The extracted audio and video are data mixed by A/V mixer 330 to generate output multimedia stream 390. It is to be understood that this embodiment reduces the hardware complexity of multimedia stream switches by minimizing the size of the audio and video extraction logic (e.g., compared to switch 200 of FIG. 2A/2B, which has A/V extractors for each input port).

FIG. 4 is a block diagram of a media system utilizing an embodiment of the invention. In this embodiment, multimedia stream switch 300 from FIG. 3 is shown to select audio and video streams from separate input ports and forward the mixed multimedia stream to processing core 450 via inter-chip multimedia stream channel 390. Processing core 450 may then decode the incoming multimedia stream via stream decoder 460 to extract audio data, video data and additional information. Before displaying the video data and playing the audio data, processing core 450 may further perform various video and audio processing via logic 470 such as image/sound enhancement, frame rate controlling, picture-in-picture mixing and so on, before outputting audio data to speaker 480 and video data to display screen 490 (in this example, audio data from stream 302 and video data from stream 301).

FIG. 5 is a block diagram of a media system utilizing an embodiment of the invention. In this embodiment, multimedia stream switch 500 receives multimedia streams 501, 502, 503 and 504. Unlike other example embodiments described above, switch 500 only includes a single audio extractor 530, which extracts audio data based on audio select 515 (it is to be understood that in other embodiments, a single video extractor may be implemented instead, and select video data based on an appropriate video select signal). The extracted audio data is forwarded to processing core 550 via inter-chip multimedia stream channel 590.

Thus, in this embodiment, multimedia stream switch 500 forwards a selected main A/V stream (e.g., stream 501 selected based on main stream select signal 510) and an extracted audio stream (e.g., audio from stream 502) to processing core 550. Audio multiplexing is performed by the processing core via audio multiplexer 575 after all the audio/video processing is finished (i.e., processing the multimedia data via stream decoder 560 and processing logic 570). The appropriate data is then asserted by processing core 550—i.e., in this example, audio data from stream 502 to speaker 580 and video data from stream 501 to display screen 590.

Figure 6:
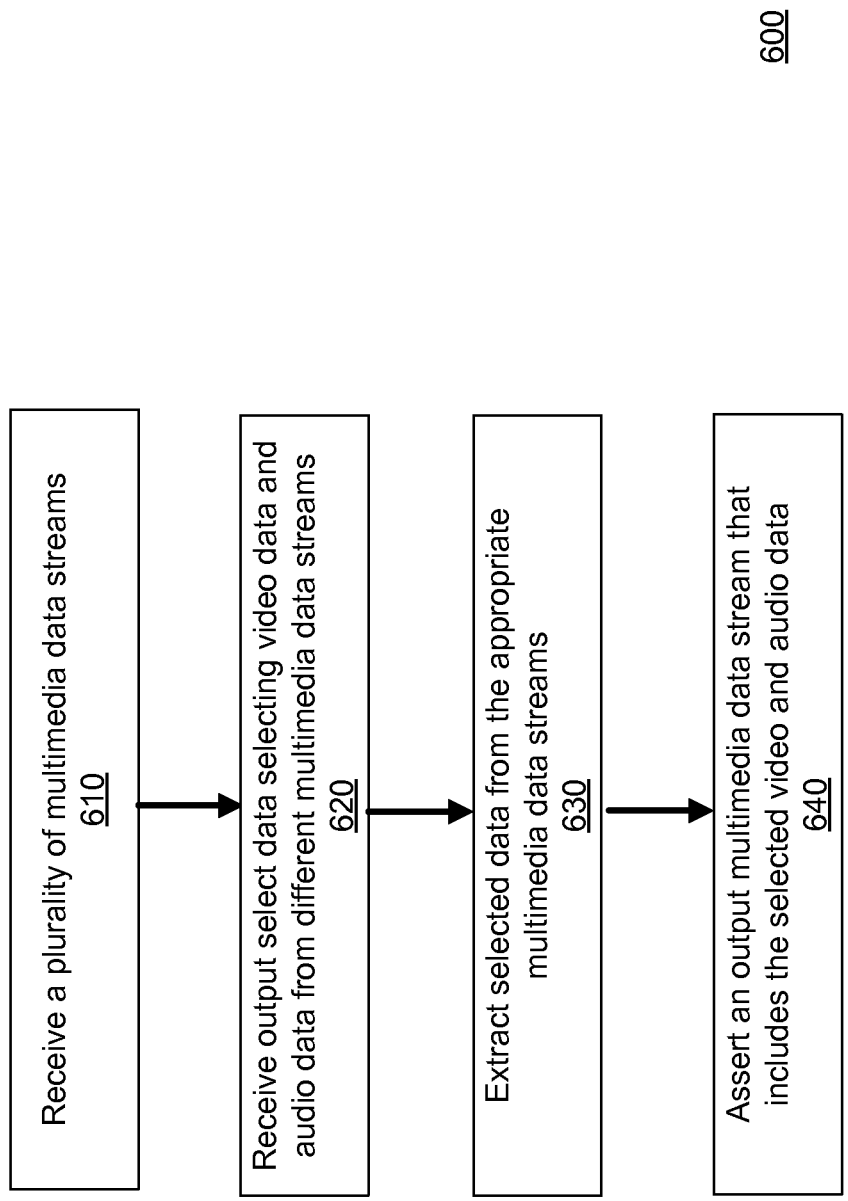
FIG. 6 is a flow diagram of an embodiment of the invention.

FIG. 6 is a flow diagram illustrating an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

During execution of process 600, a plurality of multimedia data streams is received, each stream including audio and video data, 610. Data output select data is received, 620, identifying two of the data streams—one stream to select video data from and one stream to select audio data from. The appropriate data from the selected data streams is extracted, 630. In other embodiments, audio and video data is extracted from all received streams, and the appropriate audio and video data is selected from said extracted data. An output multimedia data stream comprising audio and video data from different multimedia streams is then asserted, 640.

Figure 7:
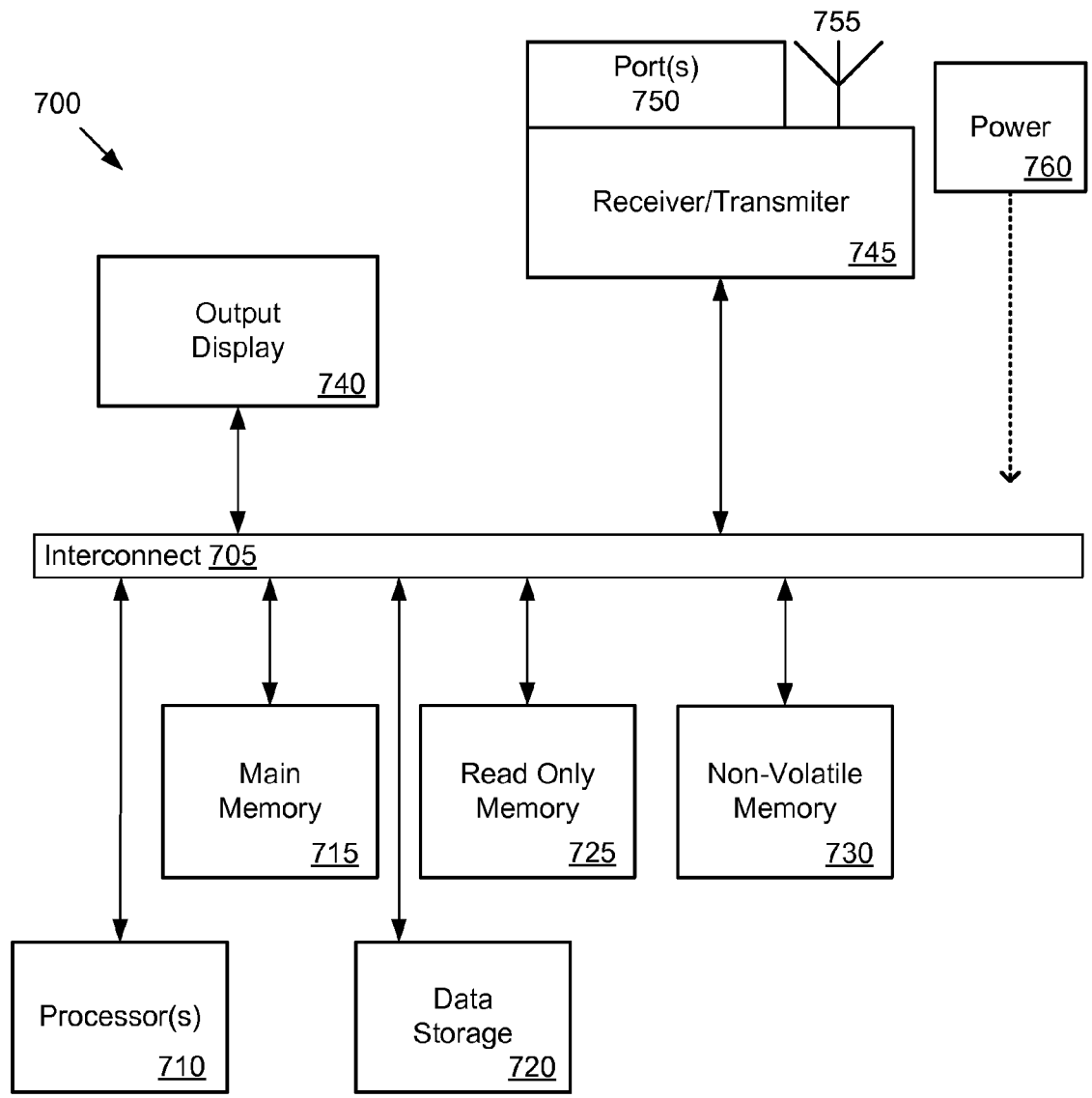
FIG. 7 is a block diagram of a system utilizing an embodiment of the invention.

FIG. 7 illustrates an embodiment of an electronic device or system utilizing an embodiment of the invention. In this illustration, certain standard and well-known components that are not germane to the present description are not shown. In some embodiments, system 700 is device capable of receiving multimedia data (i.e., video and audio data).

Under some embodiments, system 700 includes interconnect (or crossbar) 705 or other communication means for transmission of data. System 700 may include a processing means such as one or more processors (or processing cores) 710 coupled with the interconnect 705 for processing information. Processor(s) 710 may include one or more physical processors and one or more logical processors. Furthermore, each of processor(s) 710 may include multiple processor cores. Processor(s) 710 may, for example, be utilized in the processing of video data for transmission or for the processing of received video data.

Interconnect 705 is illustrated as a single interconnect for simplicity, but may represent multiple different interconnects or buses and the component connections to such interconnects may vary. Interconnect 705 shown in FIG. 7 is an abstraction that may represent any one or more separate physical buses, point-to-point connections, or both, connected by appropriate bridges, adapters, or controllers. Interconnect 705 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements).

In some embodiments, system 700 further includes random access memory (RAM) or other dynamic storage device as main memory 715 for storing information and instructions to be executed by processor(s) 710. Main memory 715 also may be used for storing data from data streams or substreams. RAM memory may include dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of system 700 may further include certain registers or other special purpose memory. System 700 also may include read only memory (ROM) 725 or other static storage devices for storing static information and instructions for processor(s) 710. System 700 may further include one or more non-volatile memory elements 730 for the storage of certain elements.

Data storage 720 may also be coupled to interconnect 705 of system 700 for storing information and instructions. Data storage 720 may include a magnetic disk or other memory devices. Such elements may be combined together or may be separate components, and utilize parts of other elements of system 700.

System 700 may also be coupled to interconnect 705 to output display or presentation day device 740. In some embodiments, display 740 may include a liquid crystal display (LCD) or any other display technology, for displaying information or content to an end user. In some environments, display 740 may include a touch-screen that is also utilized as at least a part of an input device. In some embodiments, display 740 may be utilized for the presentation of 3D video data. In some environments, display 740 may include an audio device, such as a speaker for providing audio information. In other embodiments, an audio device is separate from display 740 and operatively coupled to system 700 via interconnect 705.

One or more receivers or transmitters (i.e., to transmit received multimedia streams) 745 may also be coupled to the interconnect 705. In some embodiments, system 700 may include one or more ports 750 for the reception or transmission of data. In some embodiments, port(s) 750 may include one or more HDMI ports. System 700 may further include one or more antennas 755 for the reception of data via radio signals, such as a Wi-Fi network.

System 700 may also include power device or system 760, which may include a power supply, a battery, a solar cell, a fuel cell, or other system or device for providing or generating power. The power provided by power device or system 760 may be distributed as required to elements of system 700.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a non-tangible computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media / computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

The invention claimed is:

1. A system comprising:
    a first receiving port configured to receive a first multimedia data stream and a second receiving port configured to receive a second multimedia data stream, the second multimedia data stream different than the first multimedia stream, each of the first and the second multimedia streams comprising audio and video data;
    stream switch circuitry configured to receive a video select input and an audio select input, the video select input indicating a selection of the video data from the first multimedia stream and the audio select input indicating a selection of the audio data from the second multimedia stream;
    multimedia video and audio extraction circuitry configured to extract the video data and a video link clock from the first multimedia stream and the audio data and an audio time stamp clock from the second multimedia stream, in response to the stream switch circuitry receiving the video and audio select inputs, the multimedia video and audio extraction circuitry further configured to determine a ratio between a frequency of the audio time stamp clock extracted from the second multimedia stream and a frequency of the video link clock extracted from the first multimedia stream;

an A/V mixer configured to generate a third multimedia data stream, according to a data transfer protocol that uses the determined ratio, based on the determined ratio and based on combining the extracted video data from the first multimedia stream with the extracted audio data from the second multimedia stream;

an output port configured to output the third multimedia data stream, via the data transfer protocol that uses the determined ratio;

a multimedia stream decoder configured to receive the third multimedia data stream and to separately output the video data from the first multimedia stream and the audio data from the second multimedia stream;

an audio output device configured to receive the audio data from the multimedia stream decoder; and a video display configured to receive the video data from the multimedia stream decoder.

2. The system of claim 1, wherein:

the multimedia video and audio extraction circuitry is further configured to extract an audio clock cycle value N and a cycle time stamp (CTS) value associated with the audio data from the second multimedia stream to determine the ratio between the frequency of the audio time stamp clock extracted from the second multimedia stream and the frequency of the video link clock extracted from the first multimedia stream; and the system further comprising a multimedia stream encoder configured to receive, from the multimedia video and audio extraction circuitry, the video link clock, the audio time stamp clock, and the determined ratio, and to encode the video data from the first multimedia stream and the audio data from the second multimedia stream into a multimedia stream output based, at least in part, on the audio time stamp clock, the video link clock and the determined ratio.

3. The system of claim 1, wherein the multimedia video and audio extraction circuitry comprises:

a first multimedia video and audio extraction circuitry coupled to the first input port to extract the audio data and the video data of the first multimedia data stream; and a second multimedia video and audio extraction circuitry coupled to the second port to extract the audio data and the video data of the second multimedia data stream.

4. The system of claim 1, wherein the first and the second multimedia data streams each comprise at least one of High-Definition Multimedia Interface (HDMI) data, Digital Visual Interface (DVI) data, DisplayPort data, and Mobile High-definition Link (MHL) data.

5. A method comprising:

receiving a first multimedia stream and a second multimedia data stream different than the first multimedia stream, each of the first and the second multimedia streams comprising audio and video data;

receiving a video select input and an audio select input indicating the video data from the first multimedia stream is to be output with the audio data from the second multimedia stream;

extracting the video data and a video link clock from the first multimedia stream and the audio data and an audio time stamp clock from the second multimedia stream in response to receiving the video and audio select inputs;

determining a ratio between a frequency of the audio time stamp clock extracted from the second multimedia stream and a frequency of the video link clock extracted from the first multimedia stream; and generating a third multimedia data stream, according to a data transfer protocol that uses the determined ratio, the generating based on the determined ratio and based on combining, the video data from the first multimedia stream and the audio data from the second multimedia stream.

6. The method of claim 5, further comprising:

extracting an audio clock cycle value N and a cycle time stamp (CTS) value associated with the audio data from the second multimedia stream;

extracting the audio time stamp clock based, at least in part, on the video link clock and the CTS value; and encoding the audio data from the second multimedia stream based, at least in part, on the audio time stamp clock and the value N.

7. The method of claim 5, wherein the first and the second multimedia data streams each comprise at least one of High-Definition Multimedia Interface (HDMI) data, Digital Visual Interface (DVI) data, DisplayPort data, and Mobile High-definition Link (MHL) data.

8. An integrated circuit comprising:

a first receiving port configured to receive a first multimedia stream and a second receiving port configured to receive a second multimedia data stream, the second multimedia data stream different than the first multimedia stream, each of the first and the second multimedia streams comprising audio and video data;

stream switch circuitry configured to receive a video select input and an audio select input indicating, the video select input indicating a selection of the video data from the first multimedia stream and the audio select input indicating a selection of the audio data from the second multimedia stream;

multimedia video and audio extraction circuitry configured to extract the video data and a video link clock from the first multimedia stream and the audio data and an audio time stamp clock from the second multimedia stream, in response to the stream switch circuitry receiving the video and audio select inputs and to determine a ratio between a frequency of the audio time stamp clock extracted from the second multimedia stream and a frequency of the video link clock extracted from the first multimedia stream;

an A/V mixer configured configured to generate a third multimedia data stream, according to a data transfer protocol that uses the determined ratio, based on the determined ratio and based on combining the extracted video data from the first multimedia stream with the extracted audio data from the second multimedia stream; and an output port configured to output the third multimedia data stream, via the data transfer protocol that uses the determined ratio.

9. The integrated circuit of claim 8, wherein the multimedia video and audio extraction circuitry is further configured to:

extract an audio clock cycle value N and a cycle time stamp (CTS) value associated with the audio data from the second multimedia stream;

determine the audio time stamp clock from the CTS value and the video link clock; and encode the audio data from the second multimedia stream based, at least in part, on the audio time stamp clock, the video link clock and the value N.

10. The integrated circuit of claim 8, wherein the multimedia video and audio extraction circuitry comprises:
- a first multimedia video and audio extraction circuitry coupled to the first input port to extract the audio data and the video data of the first multimedia data stream; and
- a second multimedia video and audio extraction circuitry coupled to the second port to extract the audio data and the video data of the second multimedia data stream.

11. The integrated circuit of claim 8, wherein the first and the second multimedia data streams each comprise at least one of High-Definition Multimedia Interface (HDMI) data, Digital Visual Interface (DVI) data, DisplayPort data, and Mobile High-definition Link (MHL) data.

* * * * *